Patented Nov. 2, 1937

2,097,441

UNITED STATES PATENT OFFICE 2,097,441

AROMATIC POLYETHER CHLORIDES

Herman A. Bruson, Philadelphia, Pa., assignor to Röhm & Haas Company, Philadelphia, Pa.

No Drawing. Application May 14, 1936, Serial No. 79,718

16 Claims. (Cl. 260—150)

This invention relates to condensation products of monohydric phenols or naphthols with β-chloroethyl-β'-chloroethoxyethyl ether, Cl—CH$_2$—CH$_2$O—CH$_2$—CH$_2$—O—CH$_2$—CH$_2$Cl, said condensation products being aromatic polyether chlorides having the formula R—O—CH$_2$—CH$_2$—O—CH$_2$—
                          CH$_2$—O—CH$_2$—CH$_2$Cl wherein R is an aromatic radical of the benzene or naphthalene series.

It is an object of this invention to provide compounds of the type described which are useful as intermediates in the preparation of detergents, emulsifying and insecticidal agents.

These products may be prepared in general by heating the β-chloroethyl-β'-chloroethoxyethyl ether with the desired phenolic compound in the presence of an oxide or hydroxide of a metal capable of forming a phenolate with the phenol. These metals are preferably those of the first and second groups of the periodic table, such as sodium, potassium, calcium, magnesium, zinc, etc. In order to prevent the formation of undesired by-products and to secure as high a yield as possible of the product it is preferable to employ an excess of the dichloro polyether and an amount of metal oxide or hydroxide approximately equivalent to the amount of the phenolic compound. The reaction is advantageously carried out in the presence of water although inert organic solvents such as alcohol, dioxane, toluene, butanol, etc. may be used either alone or in conjunction with water.

The reaction is applicable to phenols and α- or β- naphthols containing only one free phenolic hydroxyl group but which may contain one or more relatively inert nuclear substituents such as saturated or unsaturated aliphatic, cyclo-alkyl, and aryl hydrocarbon radicals, alkoxy, aryloxy, aralkyl, acyl, and nitro groups or halogen atoms.

Among the typical phenolic compounds which may be used are the following: phenol, o-, m-, p-cresol, thymol, carvacrol, 1,3,5-xylenol, any of the straight-chain or branched-chain butyl, amyl, hexyl, heptyl, octyl, decyl, dodecyl, hexadecyl-phenols, or the corresponding cresols or xylenols, the o-, m-, or p-phenyl-phenols, benzylphenols, cyclohexylphenols, chlorophenols, or chlorocresols, guaiacol, the o-, m-, or p-benzoylphenols, nitrophenols, and the correspondingly substituted alpha or beta-naphthols.

In order to obtain high yields of the desired aryloxy-ethyl-chloroethoxy-ethyl ether, and to prevent the formation of halogen-free aromatic ethers, it is preferable to carry out the condensation with from 3 to 4 mols of the β-chloroethyl-β'-chloroethoxyethyl ether per mol. of the phenol or naphthol used, and to employ from 1 to 1.2 mols of caustic alkali. The condensation is usually complete after heating the mixture for about 8 hours at 110–115° C. under reflux, while stirring constantly. The product can be isolated by removing the metal chloride formed in the reaction and distilling the liquid mixture. In this manner, substantially all of the excess β-chloroethyl-β'-chloroethoxyethyl ether may be recovered and the desired product isolated by distillation under reduced pressure.

The β-aryloxyethyl-β'-chloroethoxyethyl ethers obtained, especially the nuclear alkylated derivatives having 4 to 16 carbon atoms in the alkyl group, are useful intermediates for preparing water-soluble sulfonates having capillary-active properties, by condensation with sodium sulfite. They are readily converted into amine salts by heating with ammonia or with primary, secondary, or tertiary amines. They may furthermore be converted into oil-soluble thiocyanates having insecticidal properties, by heating with sodium thiocyanate; or into oil-soluble mercaptans by heating with sodium hydrosulfide.

The following examples are given by way of illustration, it being understood that the proportions, time of reaction, and temperatures can be varied according to the rate of stirring or the size of the batch. Catalysts can be added to promote the condensation, traces of copper powder or copper oxide being suitable for the purpose.

Example 1

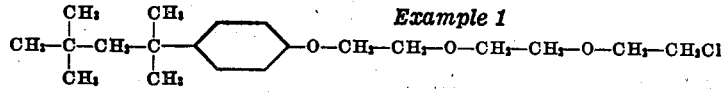

A mixture consisting of 206 grams p-α,α,γ,γ-tetramethylbutylphenol, 46.8 grams sodium hydroxide, 50 cc. water and 748 grams β-chloroethyl-β'-chloroethoxyethyl ether was heated, while stirring rapidly under a reflux condenser, for 7 hours at 110–115° C. The water was then distilled off, the sodium chloride removed by filtration, and the clear filtrate fractionated in vacuo. The excess of the dichloro ether used distilled first, followed by the desired product, which was a colorless oil boiling at 200–205° C./3 mm. Yield, 83% of theory.

Example 2

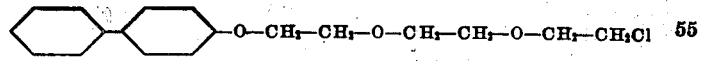

A mixture consisting of 42.5 grams para-phenylphenol, 11.7 grams sodium hydroxide, 15 cc. water, and 187 grams β-chloroethyl-β'-chloroethoxyethyl ether was heated for 7 hours at 112° C. while stirring constantly under reflux. The reaction mixture was washed with warm water and fractionated in vacuo. The β-p-phenyl-phenoxyethyl-β'-chloroethoxyethyl ether distilled at 222–225° C./3 mm. as a colorless oil, which quickly solidified to a crystalline mass, which, after recrystallization from ligroin, melted at 58° C. Yield, 75% of theory.

Example 3

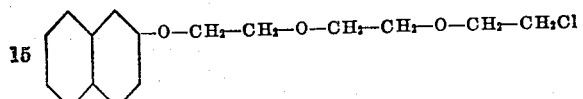

A mixture consisting of 38 grams β-naphthol, 11.7 grams sodium hydroxide, 15 cc. water, and 180 grams β-chloroethyl-β'-chloroethoxyethyl ether was heated at 110–115° C., while stirring constantly, under reflux. The sodium chloride and water were removed and the product fractionated in vacuo. The β-(β-naphthoxyethyl)-β'-chloroethoxyethyl ether is a colorless oil boiling at 207–212° C./3 mm. Yield, 83% of theory.

Example 4

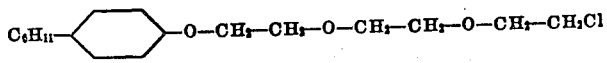

A mixture consisting of 44 grams p-cyclohexylphenol, 11.7 grams sodium hydroxide, 15 cc. water, and 187 grams β-chloroethyl-β'-chloroethoxyethyl ether was heated at 110–115° C. for 7 hours while stirring constantly under reflux. After removal of the water, sodium chloride and excess dichloro ether, the residual product was an oil which distilled at 198–200° C./3 mm. Yield, 56 grams.

The following table gives the boiling points of the β-aryloxyethyl-β'-chloroethoxyethyl ethers obtained from the phenols shown by condensation with β-chloroethyl-β'-chloroethoxyethyl ether in accordance with this invention. The yields varied from 75% to 90% of theory.

| Phenol used | R—O—CH₂—CH₂—O—CH₂—CH₂—O—CH₂—CH₂Cl obtained | |
|---|---|---|
| | R is | Physical properties |
| Phenol | ⌬— | Colorless oil B. P. 148–151° C./4 mm. |
| p-Ter-butylphenol | CH₃—C(CH₃)(CH₃)—⌬— | Colorless oil B. P. 165–168° C./3 mm. |
| p-Ter-amylphenol | CH₃—CH₂—C(CH₃)(CH₃)—⌬— | Colorless oil B. P. 189–191° C./4 mm. |
| p-Nitro-phenol | O₂N—⌬— | Yellow oil B. P. 213–215° C./2 mm. |
| o-Benzylphenol | C₆H₅—CH₂—⌬— | Colorless oil B. P. 205–208° C./3 mm. |
| o-Chlorphenol | ⌬—Cl | Colorless oil B. P. 165–171° C./3 mm. |
| o-Methoxyphenol | ⌬—OCH₃ | Colorless oil B. P. 165–170° C./3 mm. |
| Thymol | (CH₃)₂CH—⌬—CH₃ | Colorless oil B. P. 171–174° C./3 mm. |
| p-Cresol | CH₃—⌬— | Colorless oil B. P. 168–171° C./3 mm. |
| 2,4-Dichlorphenol | Cl—⌬—Cl | Colorless oil B. P. 188–193° C./4 mm. |
| p-Benzylphenol | C₆H₅—CH₂—⌬— | Colorless oil B. P. 241–247° C./4 mm. |
| p-Benzoylphenol | C₆H₅—CO—⌬— | Colorless oil B. P. 250–260° C./3 mm. |

I claim:

1. An aromatic polyether chloride having the formula

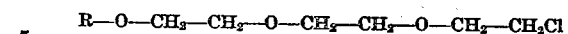

in which R is an aromatic radical obtainable from a monohydric phenol.

2. An aromatic polyether chloride having the formula

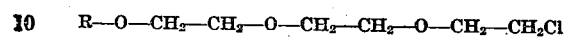

in which R is an aromatic hydrocarbon radical.

3. An aromatic polyether chloride having the formula

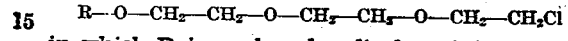

in which R is a phenyl radical containing as a nuclear substituent a monovalent hydrocarbon group.

4. An aromatic polyether chloride having the formula

in which R is a phenyl radical containing as a nuclear substituent an alkyl group.

5. An aromatic polyether chloride having the formula

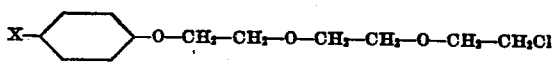

where X is a tertiary alkyl group.

6. The aromatic polyether chloride having the formula

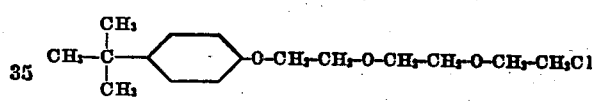

7. The aromatic polyether chloride having the formula

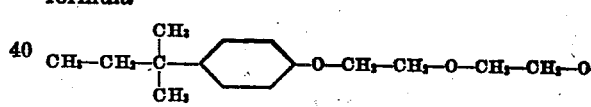

8. The aromatic polyether chloride having the formula

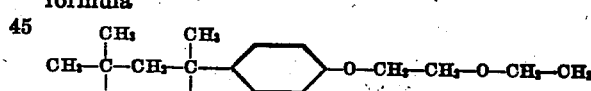

9. The process for preparing aromatic polyether chlorides having the formula

in which R is an aromatic radical, which comprises heating one mol. of a monohydric phenol, ROH, with more than one mol. of β-chloroethyl-β'-chloroethoxyethyl ether in the presence of an oxide or hydroxide of a metal chosen from Groups I and II of the periodic table.

10. The process for preparing aromatic polyether chlorides having the formula

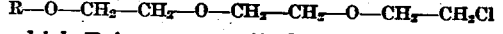

in which R is an aromatic hydrocarbon radical, which comprises heating one mol. of a monohydric phenol, ROH, with more than one mol. of β-chloroethyl-β'-chloroethoxyethyl ether in the presence of an oxide or hydroxide of a metal chosen from Groups I and II of the periodic table.

11. The process for preparing aromatic polyether chlorides having the formula

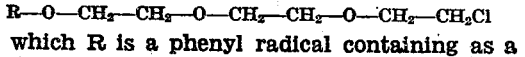

in which R is a phenyl radical containing as a nuclear substituent a monovalent hydrocarbon group, which comprises heating one mol. of a monohydric phenol, ROH, with more than one mol. of β-chloroethyl-β'-chloroethoxyethyl ether in the presence of an oxide or hydroxide of a metal chosen from Groups I and II of the periodic table.

12. The process for preparing aromatic polyether chlorides having the formula

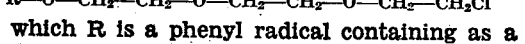

in which R is a phenyl radical containing as a nuclear substituent an alkyl group, which comprises heating one mol. of a monohydric phenol, ROH, with more than one mol. of β-chloroethyl-β'-chloroethoxyethyl ether in the presence of an oxide or hydroxide of a metal chosen from Groups I and II of the periodic table.

13. The process of preparing an aromatic polyether chloride having the formula

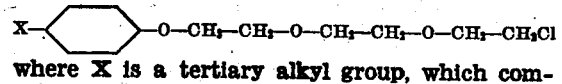

where X is a tertiary alkyl group, which comprises heating one mol. of p-tertiary alkyl phenol with more than one mol. of β-chloroethyl-β'-chloroethoxyethyl ether in the presence of sodium hydroxide.

14. The process for preparing the aromatic polyether chloride having the formula

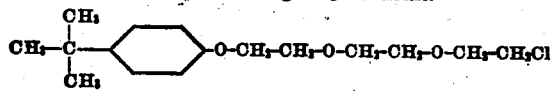

which comprises heating one mol. of p-ter-butylphenol with more than one mol. of β-chloroethyl-β'-chloroethoxyethyl ether in the presence of sodium hydroxide.

15. The process for preparing the aromatic polyether chloride having the formula

which comprises heating one mol. of p-ter-amylphenol with more than one mol. of β-chloroethyl-β'-chloroethoxyethyl ether in the presence of sodium hydroxide.

16. The process for preparing the aromatic polyether chloride having the formula

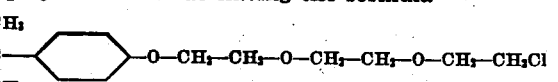

which comprises heating one mol. of p-α,α,γ,γ-tetramethylbutyl phenol with more than one mol. of β-chloroethyl-β'-chloroethoxyethyl ether in the presence of sodium hydroxide.

HERMAN A. BRUSON.